Patented Sept. 13, 1949

2,481,570

UNITED STATES PATENT OFFICE 2,481,570

REFINING OF LIQUID HYDROCARBONS

Alfred Champagnat, Paris, France, assignor to Societe Generale des Huiles de Petrole, Paris, France, a corporation of France No Drawing. Application February 20, 1947, Serial No. 729,889. In Great Britain August 5, 1939

Section 1, Public Law 690, August 8, 1946
Patent expires August 5, 1959

1 Claim. (Cl. 196—32)

This invention relates to the refining of liquid hydrocarbons particularly distilled or cracked petrol gasolines, and its object is to provide a method of extracting the mercaptans contained in such gasolines.

Methods of extracting the mercaptans dissolved in gasolines are known, in which there is used, as an extracting agent, a caustic alkaline solution the solvent capacity of which with respect to the mercaptans is greatly increased by the addition of various organic compounds known as "solutizers," potassium isobutyrate being one of the best known of such compounds.

After having become unduly loaded with mercaptans, the caustic alkaline solution containing the solutizer is regenerated by heating, steam injection, or by any other means suitable for stripping it of mercaptans. It is then again conditioned for a new extracting operation.

According to this invention there may be used as solutizers certain sulphonates of ill-defined constitution but which will be defined herein by the start material and by the procedure used for preparing them.

In the refining of the products of direct distillation of crude oil, such as kerosene and white spirits by means of concentrated sulphuric acid or oleum, acidic tars are obtained as waste products of the refining treatment. Such acidic tars are essentially comprised of a mixture of sulphuric acid and sulphonic acids, with various contaminants. The alkaline salts of the sulphonic acids, present in such acidic tars form, according to the invention, the reagent which, in caustic alkaline solution, enables extraction of the mercaptans contained in the hydrocarbons.

The method of preparing the alkaline salts of said sulphonic acids from acidic tars is based on methods which are well known in organic chemistry art and said process will be described hereinafter merely in order to define the sulphonates forming the object of this invention, and not as a feature of this invention.

The acidic tars are first diluted in water in order to reduce their viscosity. They are then neutralized by the addition of a slight excess of lime or calcium carbonate in order to secure a slight alkalinity. There is thus obtained a mixture of water-insoluble calcium sulphate and water-soluble calcium sulphonates. The calcium sulphate is filtered off. The calcium sulphonate solution is treated with sodium or potassium carbonate to produce by double decomposition a precipitate of calcium carbonate and sodium or potassium sulphonate in solution. The calcium carbonate is filtered off and finally the solution of sodium or potassium sulphonate is washed with a suitable solvent, such as a petroleum fraction for example, to free it of any colouring materials it may contain.

The solution of sodium or potassium sulphonates is concentrated to a desired degree and is mixed with a concentrated solution of caustic soda or potash, in suitable proportions. The reagent thus obtained is suitable for the extraction of mercaptans from gasolines. The caustic alkaline solution may be of any desired concentration and the proportion of sulphonates is determined by practice.

In fact, this reagent is an aqueous solution which may have the extreme following compositions:

| | Per cent |
|---|---|
| Sodium or potassium sulphonates prepared according thereto | 5 to 35 |
| KOH or NaOH | 50 to 5 |

A modification of the process of preparing the reagent consists of directly treating the acidic tars with a solution of caustic soda or potash in a suitably excessive amount. There is obtained in solution a mixture of sodium and potassium sulphates, sodium and potassium sulphonates and caustic soda and potash together with other substances or contaminants contained in the acidic tars. This solution should be washed with a suitable solvent to free it of any colouring materials it may contain. It may then be used for extracting mercaptans from gasoline as described above.

It should be observed that any organic sulphonates may not be used in preparing the reagent forming the subject matter of this invention. Benzene, toluene and xylene alkaline sulphonates are relatively insoluble in concentrated causticalkaline solutions and for this reason may not be advantageously used for preparing the reagent. However, the alkaline sulphonates of aromatic hydrocarbons as present in the kerosene and white spirits (that is petroleum distillates boiling between 120° C. and 300° C.) and which appear in concentrated form when prepared from the acidic tars resulting from the refining of such petroleum fractions, are sufficiently soluble and are accordingly suitable for the production of the reagent of the invention.

The process of extracting the mercaptans from the gasoline with the sulphonates in caustic alkaline solution is carried out in the known manner. The gasolines to be treated are washed by batches or in counter-flow conditions in suitable apparatus.

Similarly when the reagent is too highly loaded with mercaptans for its still having an efficient action, it may be regenerated in a known manner by injecting steam in counter-flow relation thereto through a stripping column or in any other fashion.

As also known, it is desirable to have this treatment follow a washing step of the gasoline to be refined with a solution of caustic soda. This solution is operative to strip it of the hydrogen sulphide and the lighter mercaptans which, if they were to be directly extracted with the reagent would cause difficulty in the regeneration thereof.

Finally after treatment with the reagent it may happen that certain gasolines still contain a very small amount of the heavier mercaptans. To eliminate the latter it would be necessary to provide an unduly large number of counter-flow stages and it then becomes more practicable from an economical standpoint to terminate the refining operation by a simple washing step with soda plumbite or any other usual method.

The purpose of extracting the mercaptans from gasolines is to improve the antiknock characteristics of the latter and their response to additions of lead tetra-ethyl, both which properties are too deeply affected by the prior methods such as treatment with soda plumbite, which methods merely convert the mercaptans into bisulphides without removing them from the gasoline.

The extraction of the near totality of the mercaptans by the application of the above-described process may therefore, when economically feasible, be completed without any inconvenience by a slight plumbite treatment which then leaves in the gasoline a very low proportion of the higher molecular weight bisulfides, without any substantial detrimental effect.

*Example 1.*—A cracking gasoline fraction having a specific gravity of 0.736 at 15° C., pre-washed with caustic soda and then containing 640 milligrams per litre of sulphur mercaptan was subjected to four washing treatments each time with 100% of a water solution containing:

Caustic potash_____grs./litre (2N) __ 112
Potassium sulphonates of kerosene tars
grs./litre__ 200

The sulphur mercaptan content of said gasoline was thus reduced to under 4 milligrammes per litre.

The octane number of said gasoline then was 65.2 and reached 74 after the addition thereto of 0.5 cc. per litre of lead tetra-ethyl.

The same gasoline when refined with soda plumbite had an octane number of 64 which reaches 72 after addition thereto of the same amount of lead tetra-ethyl.

*Example 2.*—Scrapped gasoline stock having a specific gravity of 0.751 at 15° C. was pre-washed with caustic soda and then contained 120 milligrammes per litre of sulphur mercaptan.

After two washing steps each time with 33% of the same reagent as used in connection with Example 1 its mercaptan content was reduced to less than 4 milligrammes per litre.

Its octane number then was 68.4 and after the addition thereto of 1 cc. of lead tetra-ethyl per litre reached 82.4.

By the usual treatment with soda plumbite its octane number was only 67.8 and with 1 cc. per litre of lead tetra-ethyl was 81.3.

What I claim is:

In a refining process for liquid hydrocarbons involving the extraction of the mercaptans contained therein by washing said hydrocarbons with a reagent formed by a solution of hydroxide of an alkaline metal containing solutizers therein, the use as said solutizer of a salt of an alkali metal from the group consisting of sodium and potassium, of those sulphonic acids which are present in the acid tars forming a by-product of the distillation products of crude petroleum oils, the suitable distillation range of such petroleum distillates being comprised between 120° and 300° C.

ALFRED CHAMPAGNAT.

REFERENCES CITED

The following references are of record in the file of this patent:

UNITED STATES PATENTS

| Number | Name | Date |
|---|---|---|
| 1,387,835 | Coleb | Aug. 16, 1921 |
| 1,718,335 | Cushman et al. | June 25, 1929 |
| 1,824,615 | Myers | Sept. 22, 1931 |
| 2,281,347 | Blair | Apr. 28, 1942 |
| 2,312,820 | Henderson et al. | Mar. 2, 1943 |
| 2,341,878 | Nixon et al. | Feb. 1, 1944 |
| 2,364,582 | Davis et al. | Dec. 5, 1944 |

OTHER REFERENCES

Yabroff et al., "The Solutizer Process," Refiner, May 1939, pages 171–176.